United States Patent
DeBraal et al.

(10) Patent No.: US 7,074,466 B2
(45) Date of Patent: Jul. 11, 2006

(54) BEVERAGE AND FOOD CONTAINERS, INWARDLY DIRECTED FOAM

(75) Inventors: John Charles DeBraal, Appleton, WI (US); John MacKay Lazar, Custer, WI (US)

(73) Assignee: Appleton Papers Inc., Appleton, WI (US)

( * ) Notice: Subject to any disclaimer, the term of this patent is extended or adjusted under 35 U.S.C. 154(b) by 0 days.

(21) Appl. No.: 10/113,077

(22) Filed: Apr. 1, 2002

(65) Prior Publication Data

US 2002/0182347 A1 Dec. 5, 2002

Related U.S. Application Data

(60) Provisional application No. 60/281,853, filed on Apr. 5, 2001.

(51) Int. Cl.
*B29D 22/00* (2006.01)
*B29D 23/00* (2006.01)
*B32B 1/08* (2006.01)
*B32B 27/08* (2006.01)
*B65D 39/00* (2006.01)

(52) U.S. Cl. .................. 428/34.2; 428/35.7; 428/36.5; 220/902; 220/903; 229/403; 493/903

(58) Field of Classification Search ............... 428/34.2, 428/35.7, 36.5; 220/902, 903; 229/403, 229/400, 4.5; 493/903
See application file for complete search history.

(56) References Cited

U.S. PATENT DOCUMENTS

| 3,006,780 | A | | 10/1961 | Shaffer | 117/18 |
|---|---|---|---|---|---|
| 3,049,277 | A | * | 6/1962 | Shappell | 229/403 |
| 3,329,306 | A | | 7/1967 | Stein | 220/83 |
| 3,615,972 | A | * | 10/1971 | Morehouse et al. | 156/79 |
| 3,988,521 | A | * | 10/1976 | Fumel et al. | 428/34.2 |
| 4,237,171 | A | | 12/1980 | Laage et al. | 426/127 |
| 4,288,026 | A | | 9/1981 | Wilhelm | 229/1.5 |
| 4,435,344 | A | | 3/1984 | Iioka | 264/45.1 |
| 4,551,366 | A | * | 11/1985 | Maruhashi et al. | 229/123.1 |
| 4,798,749 | A | | 1/1989 | Arch et al. | 428/36.5 |
| 5,490,631 | A | | 2/1996 | Iioka et al. | 229/403 |
| 5,514,429 | A | | 5/1996 | Kamihgaraguchi et al. | 428/34.2 |
| 5,628,453 | A | | 5/1997 | MacLaughlin | 229/403 |
| 5,759,624 | A | | 6/1998 | Neale et al. | 427/261 |

(Continued)

OTHER PUBLICATIONS

What is MICROPEARL, Pierce & Stevens, Product Information, date unknown, 7 sheets.

*Primary Examiner*—Harold Pyon
*Assistant Examiner*—Catherine A. Simone
(74) *Attorney, Agent, or Firm*—Wilhelm Law Service, S.C.; Thomas D. Wilhelm; Eric J. Lalor

(57) ABSTRACT

Beverage or food containers made from sheet material, and methods of making such containers. Such container comprises a layer of paperboard and an expanded foam layer applied as a coating in a liquid carrier, and affixed to a paperboard base layer. The expanded foam has a remote surface preferably defined by intermingled peaks and valleys. The sheet material can include a protective cover layer overlying the remote surface. Such cover layer can comprise paper, plastic film, or foamed thermoplastic. The sheet material can include a heat seal layer, with the heat seal layer overlying, and in surface-to-surface contact with, the foam layer such that the foam layer is between the paperboard and the heat seal layer. Preferred composition for the foam layer is PVDC or AMM.

20 Claims, 5 Drawing Sheets

U.S. PATENT DOCUMENTS

| | | | |
|---|---|---|---|
| 5,766,709 A | 6/1998 | Geddes et al. | 428/35.7 |
| 5,911,904 A | 6/1999 | Shih et al. | 252/62 |
| 5,952,068 A | 9/1999 | Neale et al. | 428/36.5 |
| 6,085,970 A | 7/2000 | Sadlier | 229/403 |
| 6,308,883 B1 * | 10/2001 | Schmelzer et al. | 229/403 |
| 6,416,829 B1 * | 7/2002 | Breining et al. | 428/34.2 |
| 6,482,481 B1 * | 11/2002 | Fredricks et al. | 428/34.2 |
| 6,811,843 B1 * | 11/2004 | DeBraal et al. | 428/34.2 |
| 6,852,381 B1 * | 2/2005 | Debraal et al. | 428/34.2 |

* cited by examiner

BEVERAGE AND FOOD CONTAINERS, INWARDLY DIRECTED FOAM

TECHNICAL FIELD OF THE INVENTION

This invention relates to disposable beverage and food containers. More particularly, this invention relates to disposable containers having a layer of paper. This invention especially relates to beverage and food containers designed to hold hot beverages and food, such as boiling liquid at e.g. about 100 degrees C., while protecting a users' hands from the heat by providing thermal insulation at the side walls of the containers. This invention relates still further to composite sheet materials which are used in fabricating such beverage and food containers, and to methods of making such sheet materials, and fabricating such sheet materials into such containers.

BACKGROUND

A substantial variety of designs and structures for heat-insulating containers have been proposed, and used commercially, for holding hot liquids such as beverages, as well as for holding hot foods. Although focused primarily on hot foods, containers of this invention are correspondingly suitable for holding cold liquids and cold foods. The primary problem addressed by the inventors herein is that known low cost disposable containers for holding hot liquids or hot foods generally either do not provide adequate thermal insulation, or do not provide adequate receptivity for decoration or other graphics representations on the outer surface of the container, or sheet stock structures are not amenable to facile fabrication into conical or cylindrically-shaped containers. Thus, conical-shaped paper cups are readily printed as sheet stock before being fabricated into cups and are well suited for containing hot liquids, but do not provide the insulation necessary for a user to be able to comfortably hold such container when the container holds hot (e.g. boiling temperature) liquid.

An alternative well known structure for low cost containers is expanded bead polystyrene foam cups, which provide excellent thermal insulation properties, but are generally physically weaker than paper cups, and do not well accept graphic design by printing.

Such expanded polystyrene foam container is e.g. prepared by casting unfoamed but foamable beads of polystyrene into a mold, and heating the polystyrene beads in the mold to develop the latent foam characteristics of the polystyrene beads, thus expanding the beads to form a foam cup in the mold. The so-fabricated container is then removed from the mold.

Alternatively, it is known to form a foamed styrene sheet, and to heat and thereby soften the so-formed sheet, and to heat-form the so softened sheet into container molds, to thereby form foamed cups therefrom.

In addition to the above disadvantages, such expanded polystyrene containers use precious petroleum resources and/or impose substantial volumetric load on waste streams such as incineration, land fill, and the like. As a further problem, a slow, inefficient and high waste printing process is required where it is desired to provide graphic representations on the outer surfaces of polystyrene foam heat-insulating containers, since printing can only be effected on already-fabricated containers.

Further, the tapered surface of such container contributes to blurring of any printing which is done at positions near the top and bottom of the container unless specialized and expensive printing technology is employed.

Another known conventional product is a double-wall heat-insulating paper container. Such containers cannot be manufactured at low cost because of the complexity of the manufacturing process. One example of such container is a container wherein an inner side wall layer of the body member is surrounded by a corrugated heat-insulating jacket. The process of manufacturing such container involves forming the corrugated jacket and bonding such corrugated jacket to the outer surface of an inner layer of a side wall of the container.

One disadvantage of such container, where the corrugated layer forms the outer surface of the container, is that conventional letters, figures, or other symbols so-resident on the corrugated outer surface are accordingly distorted during the process of forming the corrugations, and thus do not have aesthetic appeal to consumers. Another disadvantage is that such corrugated containers may not stack well and thus may require undesirably large volumes of storage space for warehousing, stocking, and the like.

Another example of heat-insulating containers has a dual cup-body structure wherein cooperating inner and outer cup bodies have different e.g. conical angles to a reference direction, so as to define a heat insulating chamber between the inner and outer cup bodies. The two cup bodies are joined together by curling upper portions of the respective cup bodies to form a single rim and thus to form the composite cup. Thus, the insulating chamber has a minimum cross-section adjacent the rim, and a larger cross-section adjacent the bottom of the cup, whereby the effect of the insulation properties is least adjacent the upper rim and greatest near the bottom of the cup, and generally graduated in value between the upper rim and the bottom of the cup.

The outer surface of the side wall of the outer cup body is generally sufficiently smooth to be receptive to high resolution printing as a sheet material prior to being fabricated into a cup. While graphics prospects are thus improved, the rims may easily separate, and such cups require substantial space for storage and warehousing, especially because the different conical angles preclude close nesting of an overlying cup inside an underlying cup. In addition, the manufacturing cost is undesirably high because of the multiple cup bodies in combination with the required space between the layers.

In yet another known container, the outer surface of the side wall is a heat-insulating layer of a relatively lower melting temperature foamed thermoplastic resin film, and the inner surface of the side wall is coated or laminated with a relatively higher melting temperature thermoplastic resin film. When manufacturing such container, the moisture in the intervening paper layer is vaporized by applying heat, and the vaporized moisture causes the relatively lower-melting temperature thermoplastic resin film, which is disposed outwardly of the paper layer, to expand as foam.

Such containers have an advantage of exhibiting fairly good heat insulating properties, and can be manufactured at relatively low cost by a relatively simple process. However, the moisture level in the paper layer must be controlled carefully, lest the relatively low melting temperature film not foam adequately when the paper layer is heated. Thus, while relatively higher water content is advantageous for the purpose of developing the foam in the film, the mechanical strength of a container so formed may be substantially less than optimum where such high levels of moisture are present in the paper layer. If, however, moisture level in the paper is too low, the low melting temperature film is not adequately foamed and the structure is defective for failure of thermal insulating properties.

Yet another container is known wherein a heat-insulating paper container includes a side wall comprising a paper layer wherein part but not all of the outer surface of the paper layer is printed with an ink having a volatile solvent. A thermoplastic resin film is subsequently coated over the printing layer. When the so-coated substrate is heated, the over-coated thermoplastic resin film forms a relatively thicker foamed heat-insulating layer in the printed area of the outer surface and a relatively less thick foamed heat-insulating layer in the non-printed area.

In fabricating such containers, the printing ink is thus disposed on the paper layer, and is then overcoated with the subsequently-foamed polymer layer, whereby the printing is obscured by the foamed layer which overlies the printed areas. Consequently, the quality of cup decoration, graphics, text messaging and the like are perceived as less than desirable.

Still another known container uses the polymer resin of a printing ink in an outer layer of the side wall to control, namely to restrict, expansion of an underlying foamable polymer layer to a degree of foaming which is less than the potential degree of foaming for that polymer. As a result, especially heavily printed areas of the outer surface layer expand less than unprinted areas.

As a further method of controlling the extent of foaming, indeed to counteract the restrictive control imparted by the printing ink, a mineral oil can be coated onto the foamable layer to pre-soften the foamable polymeric material, thereby to facilitate development of foam cells in the underlying polymeric thermoplastic layer.

Accordingly, there is a need for a low cost, highly insulating sheet material which can readily be fabricated at low cost into especially container side walls for use in fabricating cups and related especially conically-shaped containers.

Thus, it is an object of the invention to provide low cost substrate sheet material having an expanded foam layer, and which sheet material is readily utilized to form side walls of especially truncated conical-shaped containers, namely tapered cups.

It is another object of the invention to provide an insulating cup or other container having an expanded foam side wall having peaks and valleys in the remote surface of the expanded foam layer.

It is yet another object to provide such cup or other container wherein insulation is provided by dead air space, either between the expanded foam layer and an overlying cover layer, or between the expanded foam layer and the fingers a user uses to grip such container, or between the expanded foam layer and a thermoplastic heat seal layer.

It is still another object to provide novel processes for forming such container substrate material and for forming cups and other containers using such substrate material.

It is a still further object to provide methods for fabricating such substrate material wherein the foam layer is disposed between the paper layer and a thermoplastic heat seal layer, and wherein the heat seal layer is coated onto the foam layer with sufficient heat to thermally bond the film to the foam layer but at sufficiently low temperature that the foam layer is not deleteriously affected by such bonding heat.

SUMMARY

This invention generally comprises novel low cost, thermally insulating, single use, typically single serving, containers for use with especially hot or cold beverages, and hot or cold food, and the novel substrates used in developing suitable thermal insulation in side walls of such containers. The novel substrate is developed by applying a thin coating of expandable polymeric particles in a liquid carrier, onto a paperboard substrate, and heating the coating to thereby drive off the liquid carrier and expand the expandable particles such that the expandable particles come together as a grouped cluster and form an aggregated mass of foamed material bonded to the substrate, thus to form an expanded foam layer of the expanded microcapsules on the substrate. Such substrate is then used, preferably with additional layers, to form side walls of the recited thermally insulating containers.

A first family of embodiments of the invention are embodied in a thermally insulating beverage or food container, comprising a bottom wall; and a side wall extending upwardly from the bottom wall, the side wall comprising (i) a substrate layer comprising paperboard, (ii) an expanded foam layer, preferably a non-syntactic foam layer, having a projected area and defining a remote surface thereof, remote from the paperboard substrate layer, the remote surface of the expanded foam layer being defined by intermingled peaks and valleys, the peaks of the remote surface representing about 25 percent to no more than about 65 percent of the projected area of the remote surface, and (iii) a heat seal layer defining the inner surface of the beverage or food container. The expanded foam layer is disposed between the paperboard substrate layer and the heat seal layer.

In some embodiments, the heat seal layer is affixed to the remote surface of the expanded foam layer only at and adjacent the peaks, whereby thermally insulating dead air space is defined between the remote surface and the heat seal layer at the valleys.

The expanded foam layer has a preferred thickness of about 60 microns to about 750 microns, more preferred thickness of about 150 microns to about 500 microns and the container, when containing water at about 100 degrees C., preferably has an outer surface temperature sufficiently cool that an average person can continuously hold such container without temperature-related discomfort. Such sufficiently cool surface temperatures are no more than about 70 degrees C., preferably no more than about 65 degrees C.

The expanded foam layer preferably comprises primary polymeric material selected from the group consisting of polyvinylidene chloride copolymer and acrylonitrile/methyl methacrylate copolymer.

The expanded foam layer preferably has a density of about 0.5 pcf to about 15 pcf, with lighter densities of about 2 pcf to about 5 pcf being more preferred for purposed of conservation of materials and thermal insulating values.

The expanded foam layer preferably comprises expansion products of microcapsules expanded in accord with an earlier-applied heating process.

Preferably, an interface between the substrate layer and the expanded foam layer reflects a precursor of the expanded foam layer being applied to the substrate layer while the substrate layer was in a substantially dry condition.

In preferred embodiments, the expanded foam layer had a pre-expanded net wet coating thickness of about 0.001 mm to about 0.076 mm.

Preferably, the expanded foam layer comprises about 60 weight percent to about 90 weight percent expanded microcapsules and about 40 weight percent to about 10 weight percent binder.

A second family of embodiments comprises a method of fabricating a thermally insulating beverage or food container having a bottom wall and a side wall, and an inner surface and an outer surface. The method comprises forming a composite thermally insulating paperboard container substrate material by (i) forming a substrate precursor comprising a layer comprising paperboard, and a foam layer comprising foamed polymeric material having a density of about 0.5 pcf up to no more than about 15 pcf, and (ii) forming a layer of a film-forming polymer and applying the formed film to the foam layer to thermally bond the film to the foam layer, at a temperature sufficiently low that the foam layer is not deleteriously affected by such bonding heat, thereby bonding the film to the foam layer to thereby form the composite thermally insulating paperboard container substrate material; cutting a container side wall blank from the substrate material; and forming the container side wall blank into a container side wall and fabricating such side wall with suitable bottom material to form the insulating beverage or food container.

The method can include applying the film to the foam layer while the film contains sufficient heat from an extrusion process to thermally bond the film to the foam layer.

In preferred embodiments, the method includes forming the foam layer on the paperboard layer to thereby form the substrate precursor, by preparing a mixture comprising about 30 weight percent to about 50 weight percent solids, including at least about 25 weight percent expandable polymeric microcapsules, in a liquid carrier, coating the mixture onto the paperboard layer, to thereby form a coating layer of heat expandable polymeric microcapsules on the paperboard layer.

The method preferably includes heating the applied coating layer and thereby driving off the liquid carrier and expanding the microcapsules thereby to expand the coating layer to a nominal thickness at least 3 times, preferably at least 5 times, as great as the thickness of the coating as applied.

The method also preferably includes applying the heat expandable polymeric microcapsules to the paperboard layer at a thickness of about 1 micron to about 76 microns, and expanding the applied coating layer to a thickness of about 60 microns to about 750 microns, preferably about 150 microns to about 500 microns.

In preferred embodiments, the method includes forming the container side wall blank into a container side wall wherein the extruded film defines the inner surface of the container as a heat seal layer.

The method optionally comprises melt extruding the layer of the film-forming polymer to form the film.

Figure 1A:
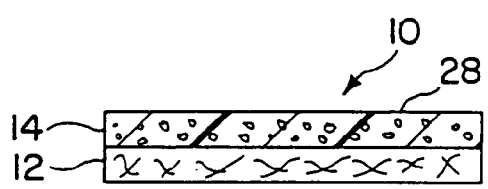
FIG. 1A shows a cross-section representation of a precursor paper-based substrate sheet material useful in making containers of the invention.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

FIGS. 1A, 1B, 2A, and 3 represent a first family of embodiments of substrates of the invention which are used in fabricating containers of the invention. FIG. 1A represents a substrate precursor 10 having a layer of paperboard 12 in surface-to-surface contact with a layer of expanded polymeric foam 14.

Figure 2A:
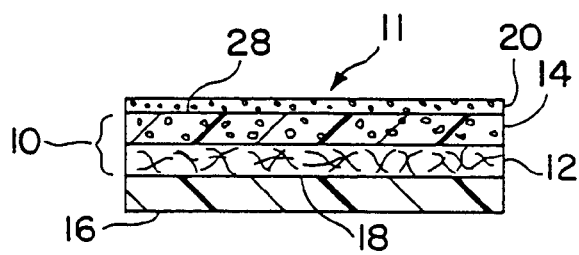
FIGS. 2A and 2B show representative cross-sections of finished substrate sheet materials useful in making containers of the invention.

FIG. 2A illustrates the completed substrate 11, including substrate precursor 10, with a polymeric heat seal layer 16 in surface-to-surface contact with paperboard layer 12 on the surface 18 of the paperboard layer which is opposite expanded foam layer 14. FIG. 2A further illustrates in general an optional cover layer 20 overlying expanded foam layer 14. Thus, the outer surfaces of substrate 11 are defined by cover layer 20 which is to be disposed on the outside surface of a container made from such substrate and heat seal layer 16, which also functions as a water barrier layer, which water barrier layer is to be disposed on the inside surface of the container.

Figure 3:
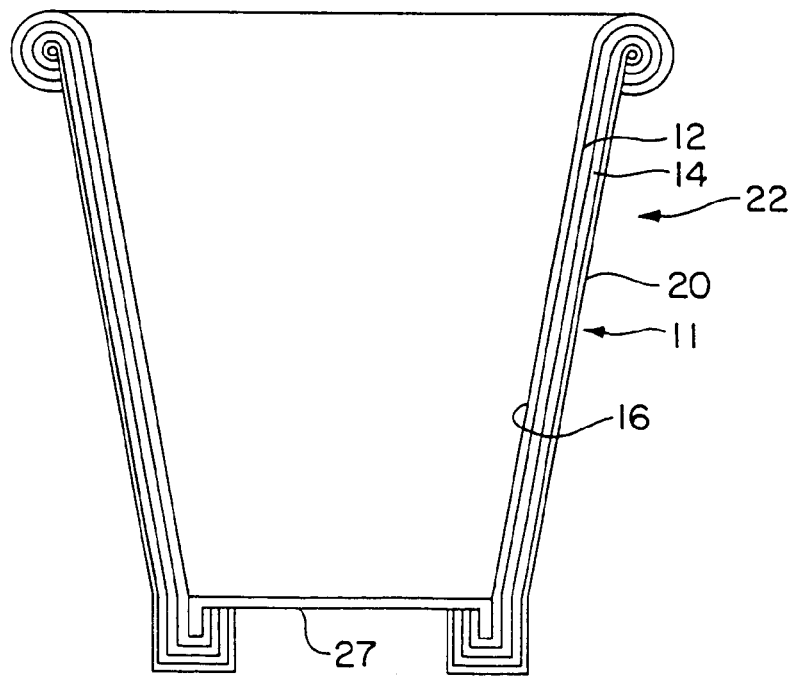
FIG. 3 shows a representative cross-section of a cup made with a sheet material of FIG. 2A.

FIG. 3 illustrates a cup-shaped container 22 fabricated using, as the side wall material, the 4-layer substrate 11 illustrated in FIG. 2A, with heat seal layer 16 disposed on the inside surface of the container and cover layer 20 disposed on the outside surface of the container. In some embodiments, no cover layer 20 is used, whereby the expanded foam layer defines the outside surface of the container.

Not shown is an optional layer of ink or other graphics materials for decorating or otherwise printing on the container. Such ink or other graphics layer can be added to either cover layer 20 where the cover layer is used, or to expanded foam layer 14.

Figure 2B:
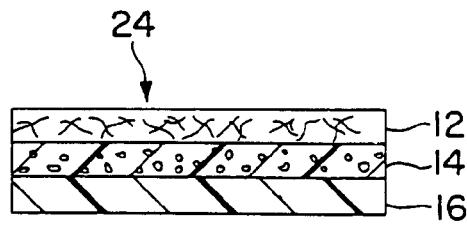
Figure 4A:
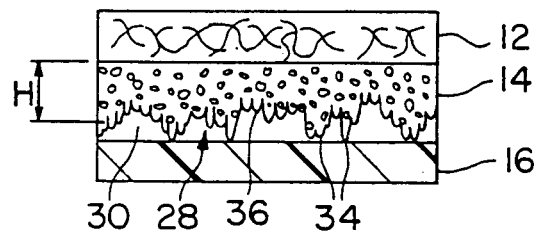
FIG. 4A shows an enlarged representations of an illustrative cross-section of the sheet materials represented in FIG. 2B, and wherein insulating dead air space is shown between the heat seal layer and the expanded foam layer.
Figure 4:
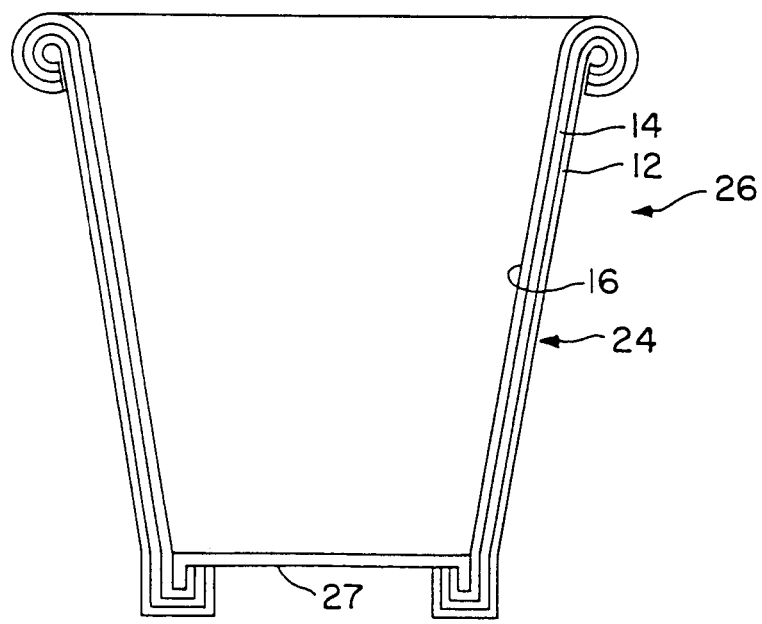
FIG. 4 shows a representative cross-section of a cup made with a sheet material of FIG. 2B.

FIGS. 2B and 4 illustrate a second family of embodiments of substrates 24 of the invention which are used in fabricating containers of the invention. As in the embodiments of FIG. 2A, in FIG. 2B, expanded foam layer 14 is in surface-to-surface contact with paperboard layer 12. However, in the embodiment of FIG. 2B, the expanded foam layer is between the paperboard layer and heat seal layer 16, such that the heat seal layer is in surface-to-surface contact with the expanded foam layer. Accordingly, the outer surfaces of substrate 24 are defined by heat seal layer 16 and paperboard layer 12. FIG. 4 illustrates a cup-shaped container 26 fabricated using, as the side wall material, the 3-layer substrate 24 illustrated in FIG. 2B, with heat seal layer 16 disposed on the inside surface of the cup, paperboard layer 12 on the outside surface of the cup, and expanded foam layer 14 as an interior layer, not exposed as a surface of the cup.

In any of the container embodiments of the invention, bottom wall 27 of the container/cup can be fabricated from any known conventional bottom wall material, or can be fabricated using a respective side wall substrate such as substrates 11 or 24. The bottom wall can be configured and applied in any manner conventionally known for configuring and applying a bottom wall to such containers, or can be configured in any other manner which suitably closes off the bottom of the container.

In any of the embodiments of the invention, the paperboard layer 12, for a single-serving container, can have a basis weight of about 50 to about 300 pounds per 3000 square foot ream and is preferably in the range of about 75 to about 250 pounds per 3000 square feet, and has a thickness of about 0.15 millimeter to about 0.75 millimeter. Typical basis weight is about 100 to about 160 pounds per 3000 square feet. The weight of the paperboard is somewhat dependent on the size of container being made. As in conventional cup design, the larger the capacity of the cup, generally the greater the basis weight of the paperboard used for the side wall. Thus, for a smaller cup, such as 3 ounce capacity or 5 ounce capacity, a lighter basis weight paperboard is used. For a larger capacity container, such as 12 ounce or 20 ounce capacity, a heavier basis weight paperboard is used.

In general, for each container capacity, the industry uses a range of paperboard substrate materials to form the side walls of conventional paper-cup containers which provide no additional thermal insulation beyond that provided by the paperboard layer, and the industry stays within that range for that given size for commercial mass distribution of containers. The ranges of the various sizes of containers do overlap each other, whereby a given weight of paperboard can, in appropriate instances, be used for two or more container sizes. However, each container size does correspond with a range of paperboard weights, each such range being encompassed within, and representing substantially less than all of, the above recited overall range of about 50 to about 300 pounds per 3000 square foot ream.

In some embodiments of the invention, especially where a strengthening layer is used in the substrate, for example when a paper layer or a plastic film layer is used as cover layer 20, the weight of paperboard layer 12 selected for use can be below the range of paperboard conventionally used for the given size container. In such instance, the paperboard weight can be as little as 70 percent or 80 percent as great as the lower end of the respective industry range, more typically about 85 percent to about 95 percent as great as the lower end of the respective industry range, thus providing a savings in cost of paperboard material.

However, in preferred embodiments, the weight of the paperboard layer 12 is within the above mentioned range of weights used for making uninsulated paper cups for use with hot drinks. However, the overall thickness of the container side wall, including all layers, is preferably within the respective industry range of thicknesses for the given cup size, such that the resultant composite sheet material can be employed on existing cup-making machines.

Heat seal layer 16 can be any polymer known for providing suitable properties for forming heat seals on the interior of the cup, and for providing a barrier to seepage of water or other liquid through the side wall substrate composite, especially to the hydrophilic paperboard layer of the side wall substrate composite. The heat seal layer is typically applied as an extrusion coating to the paperboard layer or other inwardly-disposed layer, and so should be a film-forming layer for such process application. In the alternative, the heat seal layer can be formed separately and subsequently bonded to the paperboard layer as by adhesive lamination or by use of heat and/or pressure to melt bond the heat seal layer to the paperboard.

Typical polymers useful for forming such heat seal layers are selected ones of the higher melting olefins which tolerate e.g. 100 degree C. liquid, for example polyethylene. Any polymer which tolerates the processing conditions and use conditions of the container, and which provides the desired heat seal properties and any required liquid barrier properties, is acceptable.

Returning now to FIG. 2A, the material for expanded foam layer 14 is specially selected as a material which can be applied to paperboard layer 12 in the form of a thin, e.g. about 1 micron to about 76 micron thick, coating of unexpanded polymeric particles, carried in a liquid carrier such as water, whereupon heat can be applied to the so-applied coating to drive off the liquid carrier and expand the unexpanded particles. Any carrier liquid can be used so long as such liquid can properly disperse the microcapsules and binder, and can be readily removed in the dryer or oven.

Specifically desirable materials for use as the unexpanded polymeric particles are microcapsules marketed under the trade name MICROPEARL by Pierce & Stevens Corporation, Buffalo, New York. Such microcapsules are generally spherically shaped. Each microcapsule comprises a body defining a single cell having a centrally disposed chamber containing blowing agent material, surrounded by an enclosing polymer shell or wall. MICROPEARL capsules are generally about 10 microns to about 30 microns diameter. Wall thickness is typically about 3 microns to about 7 microns. The blowing agent in the MICROPEARL microcapsules is isobutane.

MICROPEARL capsules are available having polyvinylidene chloride copolymer (PVDC) shell or wall, or acrylonitrile/methyl methacrylate copolymer (AMM) shell or 5 wall. While either polymer can be used, the PVDC is preferred for its desired foaming characteristics under the conditions employed. Such PVDC microcapsules from Pierce & Stevens have an average particle size of about 10 microns to about 20 microns. Density is about 1.13 g/cc. Flash point is about 75 degrees C. Softening temperature is about 80 degrees C. to about 85 degrees C. Expansion starting temperature is about 95 degrees C., and optimum expansion temperature is about 120 degrees C. to about 140 degrees C.

While PVDC and AMM polymers have been indicated herein specifically, any suitable combination of polymer in the shell and blowing agent in the central chamber can be used so long as the softening and expanding temperatures of the polymer correspond with the expansion temperature and other blowing properties of the blowing agent. Thus, a wide variety of other polymers can be used for the shell material, and a wide variety of known materials, which provide the requisite gaseous pressure at the softening and expansion temperatures of the respective polymer, can be used as the blowing agent. Indeed, as desired, the composition of the shell can be comprised of a combination of polymers, and the blowing agent can be comprised of a combination of agents, which blowing agents collectively expand at suitable temperatures to provide the requisite pressure to expand the softened shell of the microcapsule.

Paperboard base layer 12 is a dried paperboard, typically having water content of less than about 8–10 percent by weight, preferably less than about 5 percent by weight, whereby the surface of the paperboard represents a relatively fixed matte of paperboard fibers. In preferred such paperboard, the outer surface of the fiber matte is sufficiently porous to receive a portion of the microcapsules into interstices of the paperboard, but is sufficiently fixed in structure as to not substantially rearrange the fiber relationships in the matte as the microcapsules are applied to the surface of the paperboard.

A coating layer of the microcapsules is applied to the paperboard layer to form a generally uniform coating of such microcapsules covering generally all of paperboard layer 12. Such coating can be applied using a variety of coating processes such as air knife, blade coater, rod coater, knife over roll coater, gravure rolls, offset, gravure, flexographic, rotary screen, spray coating and the like. Realized coating thickness is between about 1 micron and about 76 microns. Preferred thickness is about 5 microns to about 50 microns. More preferred thickness is about 15 microns to about 35 microns.

Especially where a printing process is used, the foam coating can be deposited in any desired pattern, including continuous patterns or interrupted patterns. For example, such pattern can comprise a matrix of elements such as dots, lines, polygons, arcs, alpha-numeric characters, symbols, or any other fanciful design or configuration. The common property among all such patterns is that the pattern saves material, and the pattern elements are sufficiently close to each other to prevent a finger of a user from descending between the pattern elements to touch the sidewall of a container made with such coated structure. The insulation properties of the pattern are therefore controlled by the thickness and composition of the material comprising the patterned coating, together with the ratio of the area of the elements of the pattern to the area of the coated substrate which is beneath a user's fingers.

In addition to the microcapsules, expanded foam layer 14 preferably includes a suitable binder which binds the microcapsules to paperboard layer 12. Typical binders can be, for example and without limitation, such known binder materials as polyvinyl alcohol, styrene butadiene copolymer, styrene butadiene styrene copolymer, styrene ethylene butylene styrene copolymer, starch, polyacrylate, ethylene vinyl acetate copolymer, polyvinyl acetate, various other known latices, and the like. A preferred binder is a latex, sold as Genflow 5068, from Omnova Company, Fairlawn, Ohio.

The expanded foam layer is applied as an unexpanded coating of the microcapsules and binder in a liquid carrier such as water. The wet foam layer is about 30 percent to about 50 percent by weight solids. Preferred composition is about 35 weight percent to about 45 weight percent solids. Most preferred composition of the wet foam coating as applied is about 60 percent by weight water and correspondingly about 40 percent by weight solids. The solids are typically about 60 percent to about 90 percent by weight microcapsules and correspondingly about 40 percent to about 10 percent by weight binder. A preferred solids composition is about 80 percent by weight microcapsules and about 20 percent by weight binder. A highly preferred solids composition is about 80 percent by weight PVDC microcapsules containing isobutane blowing agent and about 20 percent by weight latex binder.

The solids fraction of the coating mixture varies depending on the physical properties of the specific microcapsules used, as well as the physical properties of the binder and any other ingredients included in the mixture, as well as the method used for applying the liquid coating mixture to the paperboard substrate. Thus, where e.g. lower viscosity materials are used, a higher solids content can be employed. Where higher viscosity materials are used, relatively lower solids content can be employed.

Similarly, the solids content can be adjusted as a mechanism for adjusting the dry weight of the coating applied. Thus, lower solids content can be used to apply a relatively lower dry weight coating; and a higher solids content can be used to apply a relatively higher dry weight coating.

The binder/microcapsule ratio, illustrated here at 20/80, also varies depending on the specific properties of especially the binder selected. Accordingly, lower or higher binder ratios are contemplated as compatible with the physical and adhesive interactions between the microcapsules and the binder.

The latex binder and the microcapsules are thoroughly mixed with the water or other carrier liquid before the coating is applied. As the coating dries and the microcapsules expand, the microcapsules dominate the space occupied by the foam/binder composite of the expanded foam layer. Accordingly, the resulting foamed coating layer 14 is a non-syntactic foam.

As used herein, "non-syntactic foam" means a foam wherein hollow cellular foam particles comprise the predominant material by volume, and typically by weight, and either comprise a continuous phase, particle-to-particle, or at least interrupt any continuum in any binder as a continuous phase; wherein "binder" is any material added to the composition primarily for the purpose of binding the particles either to each other or to the substrate.

The prepared coating mixture can be applied to the paperboard substrate using any known coating technique which lays down a coating over substantially all of the area of the paperboard to be coated, and wherein the coating thickness is relatively uniform. Minimum realized coating thickness is driven in part by the 10 micron diameter of the microcapsules, and in part by the ability of the small microcapsules to become embedded in the fiber matrix at the surface of the paperboard, and so generally the minimum coating thickness is about 1 micron, though a typical coating thickness is at least about 10 microns.

Maximum coating thickness is driven by the ability to retain the flowable coating in a relatively uniform thickness on the base paperboard layer until such time as the coating can be fixed in position, e.g. made non-flowable, on the paperboard substrate layer as by drying. For purposes of making thermally insulating containers from such substrate, a practical upper limit on the coating thickness is defined by that thickness which, when expanded provides the desired thermal insulation properties while retaining suitable fabrication properties to readily be fabricated into a container on conventional cup-making machines. It is well known that such machines can use only a given range of thicknesses of substrate material. A further consideration is that the resulting containers should be easily stackable in a relatively high-density stack thus to control costs of shipping and storage of such containers. Accordingly, for such application, the upper limit on realized coating thickness is typically about 76 microns.

Thus, a typical operating range of realized unexpanded coating thickness, as applied in the liquid carrier, for making container stock, e.g. for hand-held, single serving beverage containers, is about 10 microns to about 76 microns. A preferred thickness range is about 15 microns to about 50 microns. A most preferred realized coating thickness is about 25 microns.

It will be understood that a particulate coating as described above varies from location to location on the coated paperboard substrate, both on a micro scale and on a macro scale, whereby the above mentioned thickness numbers represent an average or other statistical representation of the overall coating thickness in the wet state, after application and before heating. Indeed, it is possible, and contemplated to be within the scope of the invention, that some areas of the paperboard substrate layer, within the defined boundaries of the coating application, may be devoid of the microcapsules and/or binder and/or carrier liquid. Such uncoated areas are, however, in some embodiments, so small as to represent an insignificant portion of the area of the substrate paperboard layer; and such areas are sufficiently small to typically be closed in and covered when the microcapsules are later expanded as described below. In other embodiments, some areas of the paperboard substrate layer are intentionally left uncoated. However, such uncoated areas are sufficiently small that, when the coating expands, a user's finger typically does not descend into the uncoated area far enough to touch an uncoated area of the paperboard substrate.

Accordingly, to the extent the coating process provides incomplete coverage of the paperboard layer, the coverage is sufficiently complete, and the coating is sufficiently close to continuous as the coating is applied, that the microcapsules, when expanded effectively cover any uncoated areas of the paperboard layer within overall outer boundaries generally defined by the coating layer.

The microcapsules in the coating layer are sufficiently small that the microcapsules, when coated onto the paperboard layer, can become embedded in the fibrous matrix of the surface of the paperboard layer. Thus, thickness of the coating is defined as the difference between the measured thickness of the paperboard before the coating is applied and the measured thickness of the composite of coating and paperboard shortly after the coating is applied. The resultant difference between the measured thicknesses is referred to herein as the thickness of the coating layer, or the "realized" thickness of the coating layer.

A suitable instrument for measuring such thicknesses is available from Thwing Albert Instrument Company, Philadelphia, Pa., as Model 89-1100. Such measurements are preferably taken using a contact foot having a diameter of about 16 mm.

As applied to the paperboard substrate layer, the binder and microcapsules are generally uniformly mixed with each other and, in combination with the liquid carrier, comprise a flowable composition which flows, and occupies space generally as a liquid. In such composition, the binder is generally uniformly mixed with the microcapsules, such that the binder is generally distributed throughout the coating as applied to the paperboard layer.

In general, the water forms a continuous phase of the coating while both the microcapsules and the binder form discontinuous phases generally uniformly dispersed in the mixture both with respect to the water and with respect to each other, when the coating is applied to paperboard layer 12.

After the wet coating is applied to the paperboard, the coating is passed through a drying oven or other heat source. Web temperature in the oven, assuming the preferred PVDC microcapsules, isobutane blowing agent, and latex binder, is about 120 degrees C. to about 150 degrees C., with a preferred temperature of about 130 degrees C. Residence time in the oven is about 5 seconds to about 250 seconds, with preferred residence time of about 10 seconds to about 90 seconds. A most preferred residence time in a floatation dryer is about 12 seconds at about 130 degrees C. The selected temperature and time depend on the materials being used in both the substrate and the coating, and the corresponding responses to be achieved.

The heating of the coating produces a number of resultant responses. First, the heat drives off the liquid carrier, e.g. water by evaporation, leaving the solid components of the coating, e.g. microcapsules and binder, as the remaining primary components of the coating. Second, the heat softens the shell polymer and expands the blowing agent, whereby the microcapsules expand and are thereby transformed into the expanded foam layer 14. In addition, the heat can be used to activate the binder, whereby the binder securely affixes the expanded microcapsules to the paperboard substrate layer, as well as binding the microcapsules to each other. Whether or not the heat actually participates in activating the binder, or whether some other mechanism is used to activate the binder, thereby bonding the microcapsules to the paperboard layer and to each other, depends on the specific binder selected for use, and the specific operating conditions of the oven or other heat source.

It will, of course, be understood that the above mentioned oven is merely exemplary of heat sources which can be used, and that other heat sources can well be used so long as the desired responses are achieved. Accordingly, such specific, but exemplary, heat sources as radiant heaters, convection ovens, conduction ovens, through air dryers, floatation dryers, and the like can be mentioned.

As the microcapsules expand, the direction and extent of expansion are somewhat controlled by the environment surrounding such microcapsules. Where MICROPEARL microcapsules are used, the preferred thickness of the coating layer, at about 25 microns, can generally approximate the diameters of some of the larger ones of the respective microcapsules in the coating. Nonetheless, applicants contemplate, but without being limited by such theory, that the typical, average-size microcapsules are present in the applied coating layer in a somewhat non-uniform, randomly stacked arrangement.

The binder is generally distributed around and among the microcapsules. The liquid carrier, e.g. water, generally serves as a continuous phase carrier of the microcapsules and binder. Such overall arrangement of the microcapsules with respect to the paperboard and the binder, and with respect to each other, somewhat controls the direction and extent of expansion of the respective microcapsules.

For example, a microcapsule can expand inwardly of the paperboard layer only to a limited extent because the fibrous matrix of the paperboard layer, while permissive of limited penetration of the microcapsules into such matrix, ultimately operates as a physical obstacle to expansion at some point in the expansion of the microcapsules. Similarly, if a microcapsule encounters an adjacent microcapsule as either or both of such microcapsules expand, such adjacent microcapsules provide a degree of resistance to each other's expansion. Accordingly, especially the extent of expansion in a given direction can be affected by resistance encountered as the softened microcapsule moves in that direction.

As a result, where microcapsules are relatively farther apart in the coating as applied, a given microcapsule tends to expand into a generally spherically-defined space, making allowance for not being able to expand very far inwardly toward the paperboard layer which is already adjacent or extending partially or fully around the microcapsule. Where, on the other hand, the microcapsules are relatively closer together in the coating as applied, a given microcapsule tends to expand spherically until it comes into intimate contact with one or more adjacent microcapsules and encounters resistance from such adjacent microcapsules, and then tends to expand in a direction of less resistance, generally away from the paperboard layer. Where the microcapsules are stacked on top of each other, or e.g. nested beside each other, expansion of an underlying or otherwise adjacent microcapsule can be somewhat restrained by an overlying or partially overlying microcapsule.

The ultimate height "H" of a given expanded microcapsule, or stack or column or aggregation of such microcapsules, is thus a function of, among other factors, the force applied by the blowing agent, the softness of the microcapsule polymer under the expansion conditions and the spacing and relative positionings between and among the respective adjacent microcapsules.

Since the coating as applied places the microcapsules in a generally random spacing arrangement, the specific distances and directions between respective microcapsules varies from microcapsule to microcapsule, whereby the shapes, dimensions, and the like of an aggregate population of the expanded microcapsules varies within a range of sizes, dimensions, and shapes according to the mutual contacts and resistances exerted by the microcapsules on each other as the microcapsules expand, as well as according to the bonding which can take place between respective adjacent ones of the microcapsules. As suggested by FIG. 1B, the density of the microcapsules in the applied coating is such that the preferred direction of expansion is first spherical, including laterally toward adjacent microcapsules, then away from paperboard layer 12. In such expansion, the expanding softened microcapsules tend to come into intimate contact with each other. Such intimate contact under the conditions of the softened polymer capsules being urged toward each other by the expanding blowing agent, but without restraint at the surface of the coating which is remote from paperboard layer 12, results in the capsules loosely expanding, touching and bonding to each other, but leaving substantial void spaces between and among the generally spherically-shaped microcapsules, while forming sufficient bonds with each other to form a unitary layer of such expanded microcapsules as applied in the coating, and to intimately bond the unitary foamed layer of expanded microcapsules to the paperboard substrate.

Figure 1B:
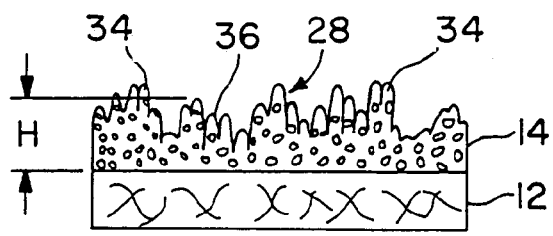
FIG. 1B shows an enlarged representation of an illustrative cross-section of the substrate sheet material of FIG. 1A showing individual groups of the expanded microcapsules.

As the expanding microcapsules form into an agglomerated, fairly continuous and unitary coating layer, expansion is necessarily directed away from paperboard layer 12. While choosing to not be bound by theory, applicants contemplate that the cross-sectional shape of a given expanded microcapsule taken along height "H" depends in some part on the resistance applied by adjacent expanding microcapsules while the microcapsules were being expanded, whereby a more dense arrangement of microcapsules results in a greater collective height "H" of respective ones of the expanded microcapsules and a less dense arrangement of microcapsules in the coating as applied results in a lesser collective height "H" of respective ones of the expanded microcapsules. Accordingly, FIG. 1B illustrates such variation in the collective height "H" of the respective microcapsules, in cross-section.

Figure 3A:
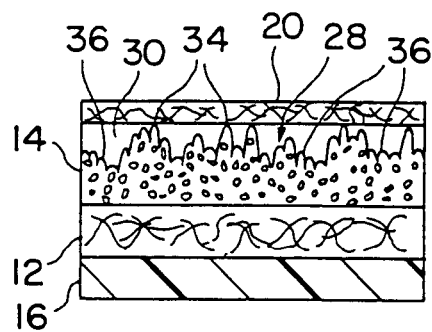
FIG. 3A shows an enlarged representation of an illustrative cross-section of the sheet materials represented in FIG. 2A wherein a sheet of paper is used as the cover layer, and wherein dead space is shown between the expanded foam layer and the paper cover layer.
Figure 3B:
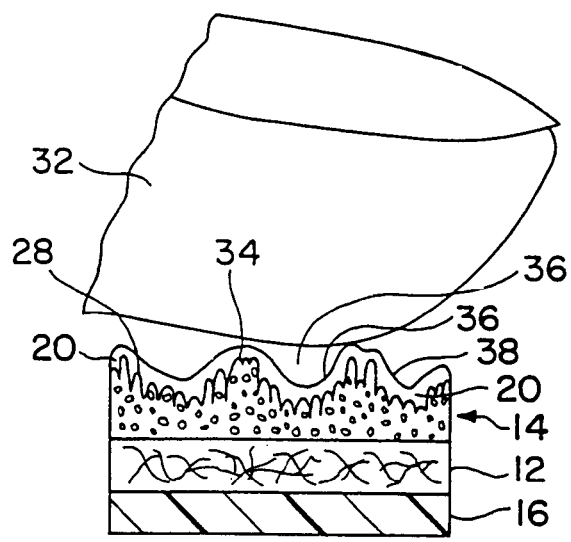
FIG. 3B shows an enlarged representation of an illustrative cross-section of the sheet materials represented in FIG. 2B wherein a polymeric foam material is used as the cover layer and preserves, to the outer surface of the sheet material, the peaks and valleys in the expanded foam layer, and wherein dead air space is shown between the cover layer and a user's gripping finger.
Figure 3C:
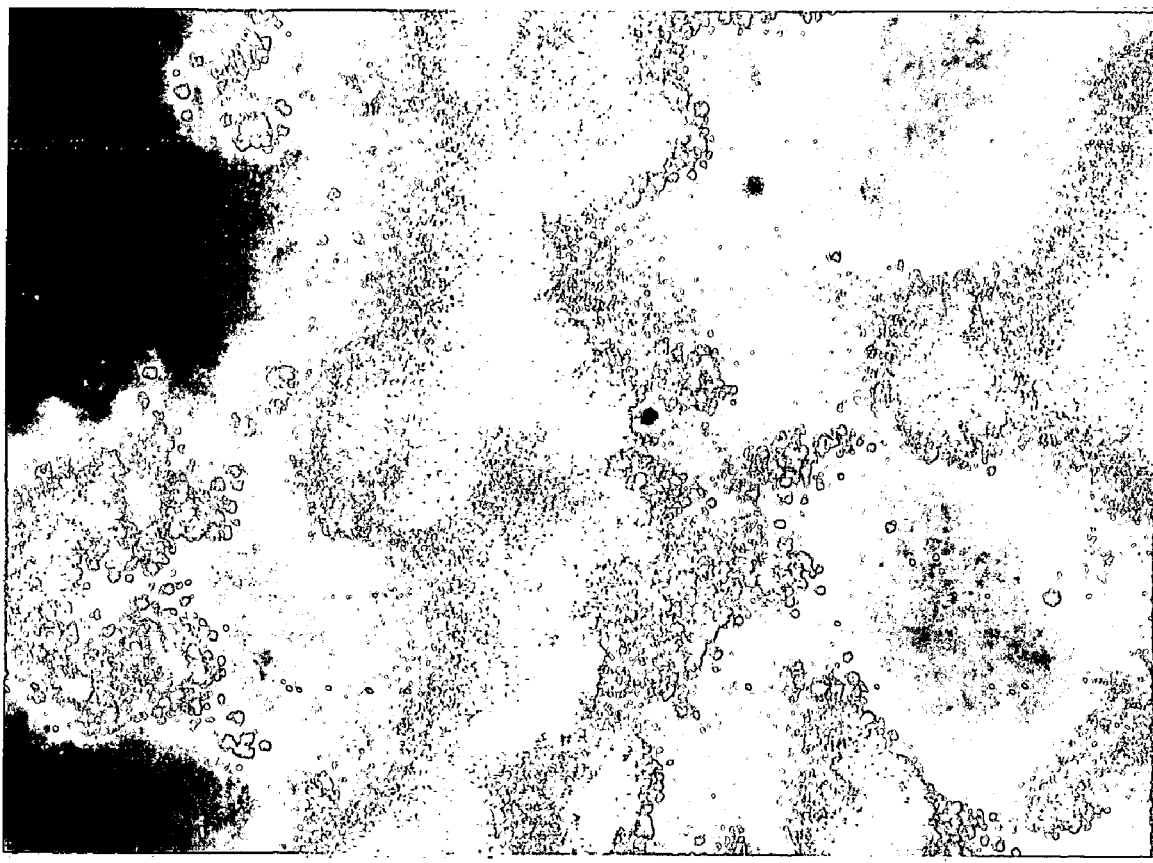
FIG. 3C is a photograph, magnified 25 times, of the expanded foam surface of inventive substrate material made herein, such as at FIG. 3B, for use e.g. in making containers of the invention.
Figure 3D:
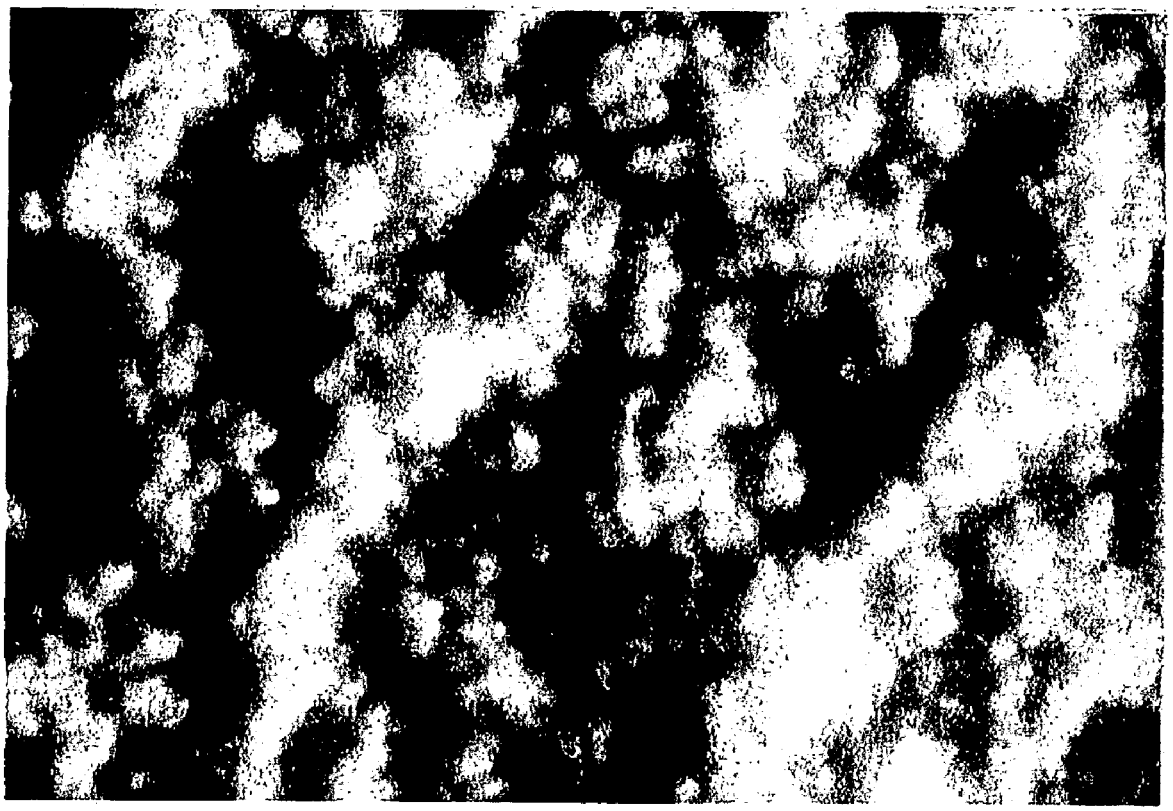
FIG. 3D is a photograph, magnified 9 times, of the expanded foam surface of inventive substrate material made herein, such as at FIG. 3B, for use e.g. in making containers of the invention.

FIG. 3C is a photograph magnified 25 times, and FIG. 3D is a photograph magnified 9 times, of the surface of such expanded foam layer 14. As can be seen in FIGS. 3C and 3D, and as further illustrated in FIGS. 1B and 3B, the remote outer surface 28 of the expanded foam layer 14 is defined by intermingled peaks 34 and valleys 36 wherein the peaks of the remote surface represent about 25 percent to no more than about 65 percent of the projected area of the remote surface projected onto paperboard layer 12. Generally, the peaks represent at least about 35 percent of the projected area, and no more than about 55 percent of the projected area.

"Peaks" 34 as used herein represent substantially the greatest heights "H" of respective ones of the expanded microcapsules.

Correspondingly, "valleys" 36 are generally defined by those areas of expanded foam layer 14 wherein the heights "H" are less than about 80 percent of the greatest heights above the nominal surface of the paperboard substrate.

The MICROPEARL microcapsules disclosed herein have capacity to expand to about 10 times to about 13 times the original unexpanded volumes of the respective microcapsules. When applied as a coating as described here, the thickness of the coating expands to at least 3 times the thickness of the coating as originally applied, preferably at least 5 times the thickness of the coating as originally applied. Thus, where a coating about 20 microns thick is applied to paperboard layer 12 in the liquid carrier, the expanded thickness of such coating, after passing through e.g. a floatation dryer oven, and expanding and aggregating as a group of such expanded microcapsules to form a continuous layer, is at least about 60 microns, preferably at least about 100 microns. Such thickness of the expanded foam layer is measured at an approximation of the average height of the peaks on remote surface 28.

An upper limit on the degree of expansion of layer 14, which is acceptable in container substrates, is driven at least in part by the overall thickness of a substrate 11 or 24 which can be employed in conventional cup-making machines for making e.g. single serving paper cups, having an upstanding side seam, for holding hot liquid. Namely, substrate 11, 24 of the invention is generally intended to be used in such cup-making machines, whereby the overall thickness of the substrate should be compatible with such use. To that end, thickness of any of the layers can be adjusted to accommodate thickness in another layer. Similarly, resilient compressibility of e.g. the expanded foam layer can contribute to thickness-suitability of a substrate 11, 24 for use in such cup-making machines. Thus, allowing for such compressibility effect, overall thickness of a substrate 11, 24 should be within the range of thicknesses acceptable for use in such cup-making machines.

As referred to herein, "thickness" of expanded foam layer 14 is the "realized thickness," namely the difference between the thickness of the uncoated paperboard and the thickness of the composite of the paperboard and the expanded foam layer. Such thickness is readily measured using the above noted instrument Model 89-100 from Thwing Albert Instrument Company.

Given the known specific gravity of the MICROPEARL microcapsules before expansion at 1.13, and given the accepted expansion limits on the microcapsules of about 13× volume expansion, one can calculate both the theoretical expanded diameter at about 2.5 times the unexpanded diameter, and the expanded volume of the expanded coating at about 13 times the unexpanded volume. Thus, for a 20 micron unexpanded realized thickness, the calculated expanded thickness is about 50 microns, and the calculated density is about 5.5 pounds per cubic foot.

The inventors herein have discovered that the effective densities achieved in structures of the invention are substantially less than the calculated densities. For example, where a calculated density of about 5.5 pcf is calculated, a realized bulk density, calculated using realized thickness measurement, is about 0.5 pcf to about 1 pcf. While choosing to not be bound by theory, the inventors contemplate the realized density as having at least 3 contributory factors. The first factor is the void space inside the expanded capsules, which is represented by the above calculated 13× expansion.

The second factor is the space between the expanded capsules. FIGS. 3C and 3D illustrate substantial spaces between respective ones of the expanded spherical capsules. Since the microcapsules expand without any overlying restraint, the inventors contemplate that there are substantial void spaces between the respective expanded capsules, while providing for sufficient contact to retain the expanded capsules as an aggregated unitary layer 14.

The third factor is the substantial void volume represented in valleys 36 where adjacent peaks 34 are substantially spaced from each other.

Overall, the realized bulk density of the expanded foam layer is typically between about 0.5 pcf and about 10 pcf. Preferred densities are in the lower end of the range, such as 1 pcf, 3 pcf, 5 pcf, and the like, for cost effective achievement of thermal properties.

Where greater bulk and strength are desirable, higher densities up to about 15 pcf are used. Such higher densities can be obtained by using lower heating temperature and/or shorter heating times and/or less blowing agent in the capsules. Generally, any realized bulk density from about 0.5 pcf along a continuum up to about 15 pcf can be obtained by suitably adjusting heating temperature and heating time.

Given the above thickness constraints, where a substrate 11, 24 is to be used in existing side-seaming paper cup making machines, the thickness of the expanded foam layer is generally limited to about 750 microns.

The inventors herein have discovered that the structures employed herein surprisingly provide a desired level of thermal insulation in a relatively thin substrate structure composite. Accordingly, a cup made with substrate 11 or 24, e.g. with thickness of expanded foam layer 14 of about 250 microns, when containing water at about 100 degrees C., has an outer surface temperature of no more than about 70 degrees C., in some embodiments no more than 65 degrees C.

The peaks and valleys configuration of remote surface 28 offer opportunity for isolating the space above the valleys and below the level of the peaks as dead insulating space. One way of capturing such dead space is to cover the expanded foam layer 14 with a thin layer of sheet material such as paper or plastic, contacting the remote surface only at and adjacent the peaks. Thus, a paper layer of e.g. about 7 pounds to about 75 pounds per 3000 square foot ream, about 0.006 mm to about 0.15 mm thick, preferably about 12 pounds to about 50 pounds and about 0.01 mm thick to about 0.10 mm thick, can be used as cover layer 20 to capture such insulating dead air space 30 as is illustrated in FIG. 3A. For example, a tissue-strength paper layer of about 10–12 pounds per ream can be used as the cover layer, affixed to the expanded foam layer only at and adjacent the peaks.

Similarly, a polymeric film e.g. about 0.006 mm to about 0.15 mm thick, preferably about 0.01 mm thick to about 0.10 mm thick, can be employed at the same location in place of the paper. In either event, the dead air space 30 is captured and retained between the remote surface 28 of expanded foam layer 14 and a respective cover layer 20.

Cover layer 20 can be any of a variety of materials which meet some or all of the parameters desired for layer 20. An optional composition for cover layer 20 is a layer of expanded polymeric foam. While the substrate can be used with the expanded foam layer exposed as the outer surface of the container, it is preferred to apply a cover layer 20 in order to thereby obtain certain enhanced properties.

As a preferred property, it is desirable, but not required, that cover layer 20 provide a good printing surface. In addition, the cover layer can provide for and preserve dead air spaces 30 generally above valleys 36 of the expanded foam layer.

Cover layer 20 need not have good strength properties in and of itself. Applicants have found that a sheets of paper or plastic film which have low tensile strength as stand-alone layers can be suitable for use as cover layer 20 wherein the cover layer is firmly bonded to the foam layer at the peaks of the foam layer.

In the embodiment of FIG. 3A, dead air space is preserved between the paper of cover layer 20 and remote surface 28 of expanded foam layer 14, at valleys 36.

In the embodiment of FIG. 3B, the outer surface 38 of the polymeric coating of cover layer 20 somewhat follows, and thereby preserves the essence of, the peak and valley characteristic of remote surface 28 of the expanded foam layer. The corresponding peak and valley character of the outer surface of the substrate thus serves as one element in defining dead air space above the valleys of the outer surface of the substrate, in combination with a user's finger 32, as illustrated in FIG. 3B.

Where a polymeric cover layer 20, is illustrated in FIG. 3B is used, a preferred material is a foamed acrylic polymer, applied in water carrier with suitable additives. A typical composition of such coating material, in percent dry weight, is as follows

| | |
|---|---|
| Acrylic polymer | 58 |
| Pigment as desired | 38 |
| Compatibilizing agents | 2.4 |
| Foaming agent | 1.5 |
| Rheology modifier | 0.1 |

Such foamed coating can be formed by whipping air into a combination of the above composition and water, wherein the above composition represents about 40 percent by weight of the combination with the balance being water.

In the alternative, pre-expanded acrylic polymer foam compositions are available as DUALITE M6050 AE and as DUALITE MS 7000, both from Pierce and Stevens Company, Buffalo, N.Y. Such foam combination can be applied to remote surface 28 by any known coating method as described above, e.g. air knife, coating blade, coating rod, knife over roll, gravure rolls, and the like, at an application weight, dried and cured, of about 2 pounds per 3000 square feet to about 20 pounds per 3000 square feet. Such cover layer material, after the carrier liquid is removed e.g. by heating, has a thickness of about 0.05mm. to about 0.38 mm.

Once applied to the expanded foam layer, the liquid in the foamed coating 20 is driven off by heating the coated substrate for a short period of time, e.g. passing the coated substrate through a floatation dryer at 120 degrees C., with residence time while exposed to the operating temperature of the dryer/oven of preferably about 5 seconds to about 15 seconds.

Where a coating of e.g. acrylic foam polymer is applied to the expanded microcapsule foam layer, as illustrated in FIG. 3B, the dead air space of interest is captured by the combination of the structure of the surface of the substrate, including the expanded foam layer and the cover layer, and the user's finger or hand. As illustrated in FIG. 3B, the user's finger 32 presses primarily against the peaks 34 and is generally spaced from valleys 36. Namely, the finger bridges valleys 36, whereby the space between the finger and the unoccupied portions of the valleys represents effectively-insulating dead air space.

In the embodiments represented by FIGS. 2B and 4A, heat seal layer 16 is affixed to remote surface 28 of expanded foam layer 14, which remote surface has the above described combination of peaks 34 and valleys 36. An exemplary continuous process for applying heat seal layer 16 onto remote surface 28 is illustrated in FIG. 5.

Figure 5:
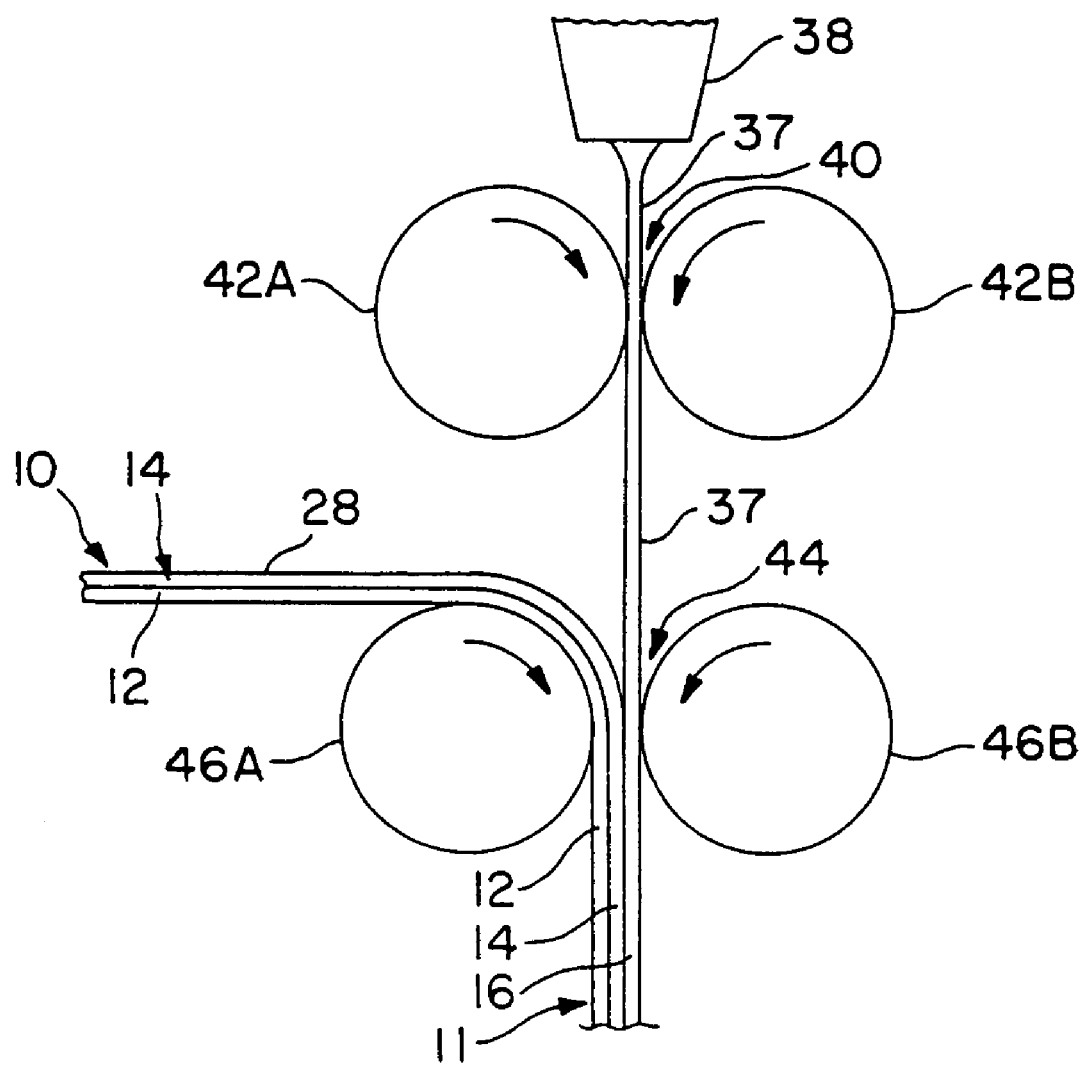
FIG. 5 shows a side elevation view of a representation of an extrusion laminating process used to bond the heat seal layer to the expanded foam layer.

As seen in FIG. 5, a film 37 of material suitable for forming heat seal layer 16 is extruded from an extrusion die 38 into a nip 40 between chill rolls 42A, 42B, or can be cast on one of chill rolls 42A, 42B, and thence fed into nip 40, whereupon the temperature of heat seal layer 16 is established at a desired level for bonding to remote surface 28 of the expanded foam layer. From nip 40, the film advances to nip 44 and passes between bonding rolls 46A, 46B.

Substrate precursor material 10, including paperboard layer 12 and expanded foam layer 14, is fed around bonding roll 46A and into nip 44 with remote surface 28 of expanded foam layer 14 facing away from bonding roll 46A, thus to come into contact with film 37 which is advancing from nip 40. Rolls 46A and 46B can be separately maintained at suitable temperatures to promote the bonding which takes place in nip 44. Generally, the temperature of roll 46A is less than the temperature of roll 46B. Remote surface 28 and film 37 are thus brought together in nip 44 with sufficient heat, and sufficient but modest pressure, to bond the heat seal layer to remote surface 28 without deleteriously affecting the thermal insulating properties of expanded foam layer 14. Upon exiting nip 44, the three-layer composite sheet structure is cooled to thereby obtain the sheet structure of FIG. 2B.

In an alternative process, film 37 can be separately formed and wound up into a roll for storage until needed. The film is then unwound from the roll, and passed through suitable heating steps such as being heated by roll 42A or 42B whereby the temperature of the film is established at a desired level for bonding to the remote surface 28, and is thence passed to nip 44 where such bonding takes place.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

The invention claimed is:

1. A thermally insulating beverage or food container, comprising:
   (a) a bottom wall; and
   (b) a side wall extending upwardly from the bottom wall, said side wall comprising
      (i) a substrate layer comprising paperboard,
      (ii) an expanded foam layer having a projected area and defining a remote surface thereof, remote from said paperboard substrate layer, the remote surface of said expanded foam layer being defined by intermingled peaks and valleys, the peaks of the remote surface representing about 25 percent to no more than about 65 percent of the projected area of the remote surface, and
      (iii) a heat seal layer comprising a polymeric film defining the inner surface of said beverage or food container,
   said expanded foam layer being disposed between said paperboard substrate layer and said heat seal layer such that said expanded foam layer is not exposed as a surface of said food or beverage container and said heat seal layer defining a barrier between said expanded foam layer and contents of said beverage or food container, said expanded foam layer being in contact with said paperboard substrate layer, said heat seal layer being affixed to the remote surface of said expanded foam layer only at and adjacent the peaks, whereby thermally insulating dead air space is defined between the remote surface and the heat seal layer at the valleys.

2. A thermally insulating food or beverage, comprising:
   (a) a bottom wall; and
   (b) a side wall extending upwardly from said bottom wall, said side wall comprising
      (i) a substrate layer comprising paperboard, and
      (ii) an expanded foam layer affixed to the substrate paperboard layer and
      (iii) a heat seal layer comprising a polymeric film defining the inner surface of said beverage and food container,
   said heat seal layer affixed to said expanded foam layer, and said expanded foam layer being disposed between said paperboard substrate layer and said heat seal layer such that said expanded foam layer is not exposed as a surface of said food or beverage container, said expanded foam layer comprises expanded products of polymeric microcapsules expanded in accord with an earlier-applied heating process, an interface between said substrate layer and said expanded foam layer includes a portion of said microcapsules in interstices of said paperboard of said substrate layer.

3. A thermally insulating food or beverage container, comprising:
(a) a bottom wall; and
(b) a side wall extending upwardly from said bottom wall, said side wall comprising
    (i) a substrate layer comprising paperboard, and
    (ii) an expanded foam layer comprising expanded products of polymeric microcapsules expanded in accord with an earlier-applied heating process, and affixed to the substrate paperboard layer, said expanded foam layer having been applied as a coating of heat expandable microcapsules on said paperboard substrate layer, said expanded foam layer having a portion of said microcapsules in interstices of said paperboard of said substrate layer, and
    (iii) a heat seal layer defining the inner surface of said beverage or food container
said expanded foam layer being disposed between said paperboard substrate layer and said heat seal layer,
said container, when containing a hot liquid at 100 degrees C., having an outer surface temperature, at the outer surface, sufficiently cool that an average person can continuously hold such container without temperature-related discomfort.

4. A thermally insulating food or beverage container as in claim 1, said heat seal layer being affixed to said expanded foam layer.

5. A thermally insulating food or beverage container as in claim 1, said expanded foam layer having a thickness of about 60 microns to about 750 microns.

6. A thermally insulating food or beverage container as in claim 1, said expanded foam layer having a thickness of about 150 microns to about 500 microns and said container, when containing water at about 100 degrees C., having an outer surface temperature of no more than about 70 degrees C.

7. A thermally insulating food or beverage container as in claim 1, said expanded foam layer having a thickness of about 150 microns to about 500 microns and said container, when containing water at about 100 degrees C., having an outer surface temperature of no more than about 65 degrees C.

8. A thermally insulating food or beverage container as in claim 1, said expanded products of microcapsules comprising primary polymeric material selected from the group consisting of polyvinylidene chloride copolymer and acrylonitrile/methyl methacrylate copolymer.

9. A thermally insulating food or beverage container as in claim 1, said expanded foam layer having a realized bulk density of about 0.5 pcf to about 15 pcf.

10. A thermally insulating food or beverage container as in claim 1, wherein an interface between said substrate layer and said expanded foam layer includes a portion of said microcapsules in interstices of said paperboard of said substrate layer.

11. A thermally insulating food or beverage container, comprising:
(a) a bottom wall; and
(b) a side wall extending upwardly from said bottom wall, and having an outer surface and an inner surface, said side wall comprising
    (i) a substrate layer comprising paperboard, and
    (ii) an expanded foam layer comprising expanded products of a generally uniform mixture of polymeric microcapsules and binder, expanded in accord with an earlier-applied heating process, and affixed to the substrate layer, a portion of said microcapsules of said expanded foam layer being in interstices of said paperboard of said substrate layer, said expanded foam layer comprising about 60 weight percent to about 90 weight percent expanded microcapsules and about 40 weight percent to about 10 weight percent binder, and
    (iii) a heat seal layer defining the inner surface of said beverage or food container,
said expanded foam layer being disposed between said paperboard substrate layer and said heat seal layer.

12. A thermally insulating food or beverage container as in claim 11, said heat seal layer being affixed to said expanded foam layer.

13. A thermally insulating food or beverage container as in claim 11, said expanded foam layer having a thickness of about 60 microns to about 750 microns.

14. A thermally insulating food or beverage container as in claim 11, said expanded foam layer having a thickness of about 150 microns to about 500 microns and said container, when containing water at about 100 degrees C., having an outer surface temperature of no more than about 70 degrees C.

15. A thermally insulating food or beverage container as in claim 11, said expanded foam layer having a thickness of about 150 microns to about 500 microns and said container, when containing water at about 100 degrees C., having an outer surface temperature of no more than about 65 degrees C.

16. A thermally insulating food or beverage container as in claim 11, said expanded products of microcapsules comprising primary polymeric material selected from the group consisting of polyvinylidene chloride copolymer and acrylonitrile/methyl methacrylate copolymer.

17. A thermally insulating food or beverage container as in claim 11, said expanded foam layer having a realized bulk density of about 0.5 pcf to about 15 pcf.

18. A thermally insulating food or beverage container as in claim 11, wherein an interface between said substrate layer and said expanded foam layer includes a portion of said microcapsules in interstices of said paperboard of said substrate layer.

19. A thermally insulating beverage or food container, comprising:
(a) a bottom wall; and
(b) a side wall extending upwardly from the bottom wall, said side wall comprising
    (i) a substrate layer comprising paperboard,
    (ii) an expanded foam layer having a projected area and defining a remote surface thereof, remote from said paperboard substrate layer, the remote surface of said expanded foam layer being defined by intermingled peaks and valleys, the peaks of the remote surface representing about 25 percent to no more than about 65 percent of the projected area of the remote surface, and
    (iii) a heat seal layer defining the inner surface of said beverage or food container,
said expanded foam layer being disposed between said paperboard substrate layer and said heat seal layer, and said heat seal layer being affixed to the remote surface of said expanded foam layer only at and adjacent the peaks, whereby thermally insulating dead air space is defined between the remote surface and the heat seal layer at the valleys.

20. A thermally insulating food or beverage container, comprising:

(a) a bottom wall; and
(b) a side wall extending upwardly from said bottom wall, said side wall comprising
   (i) a substrate layer comprising paperboard, and
   (ii) a non-syntactic expanded foam layer comprising expanded products of polymeric microcapsules expanded in accord with an earlier-applied heating process, and affixed to the substrate paperboard layer, said expanded foam layer having been applied as a coating of heat expandable microcapsules on said paperboard substrate layer, and
   (iii) a heat seal layer defining the inner surface of said beverage and food container, said expanded foam layer being disposed between said paperboard substrate layer and said heat seal layer, wherein an interface between said substrate layer and said expanded foam layer includes a portion of said microcapsules in interstices of said paperboard of said substrate layer.

* * * * *